Sept. 7, 1965  H. C. POWELL  3,204,892
AEROSPACE VEHICLE
Filed Aug. 1, 1963  3 Sheets-Sheet 1
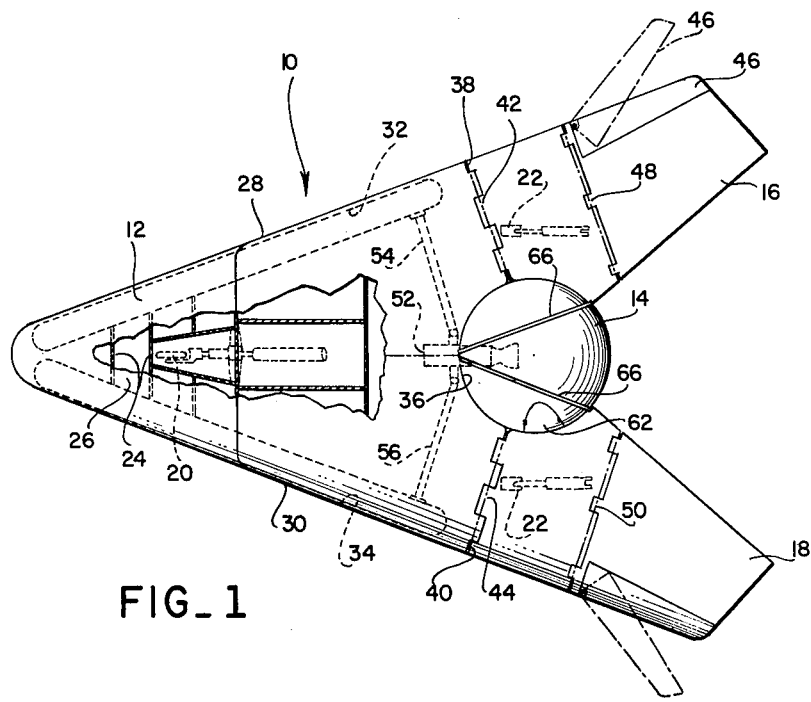
FIG_1
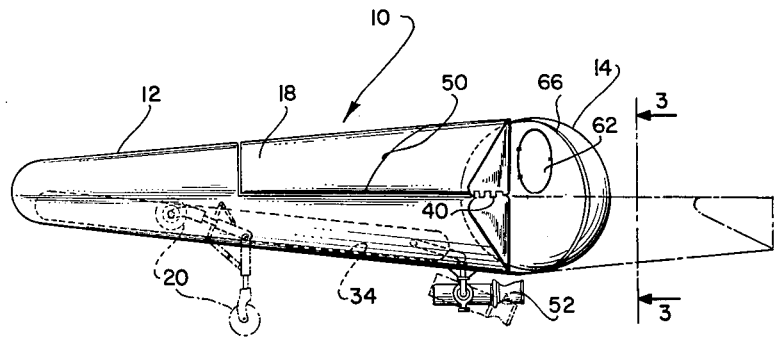
FIG_2
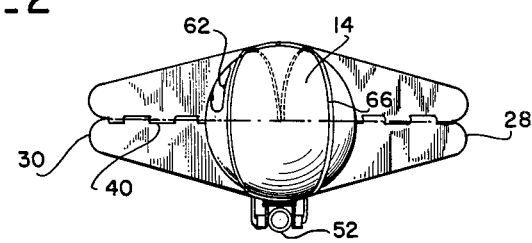
FIG_3
INVENTOR.
HARRY C. POWELL
BY George C. Sullivan
Agent Sept. 7, 1965           H. C. POWELL           3,204,892
AEROSPACE VEHICLE
Filed Aug. 1, 1963                         3 Sheets-Sheet 2
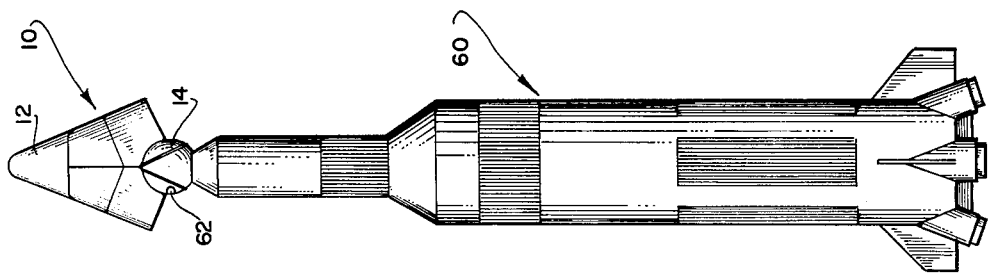
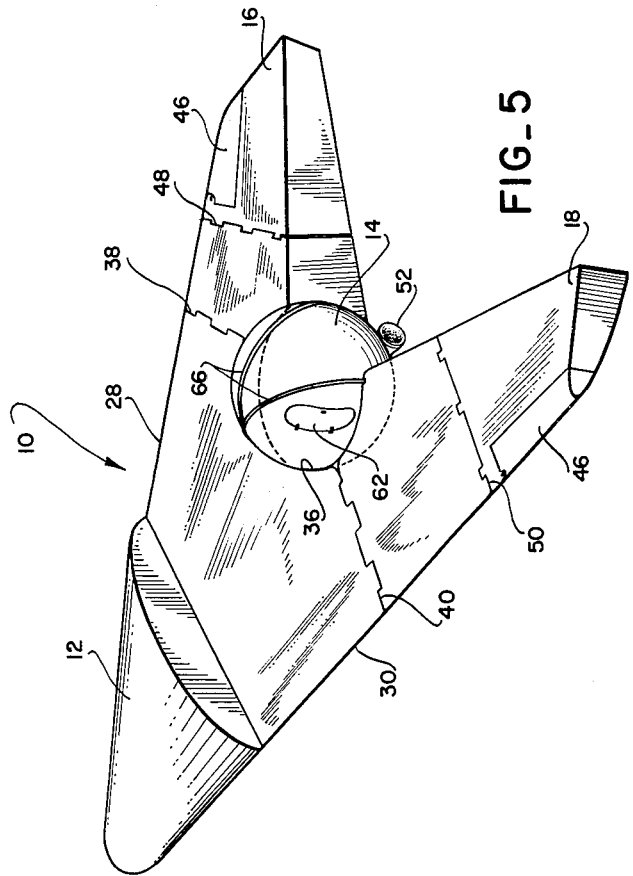
INVENTOR.
HARRY C. POWELL
BY
*George C. Sullivan*
Agent Sept. 7, 1965　　　　　　　　H. C. POWELL　　　　　　　3,204,892
AEROSPACE VEHICLE
Filed Aug. 1, 1963　　　　　　　　　　　　　　　　3 Sheets-Sheet 3
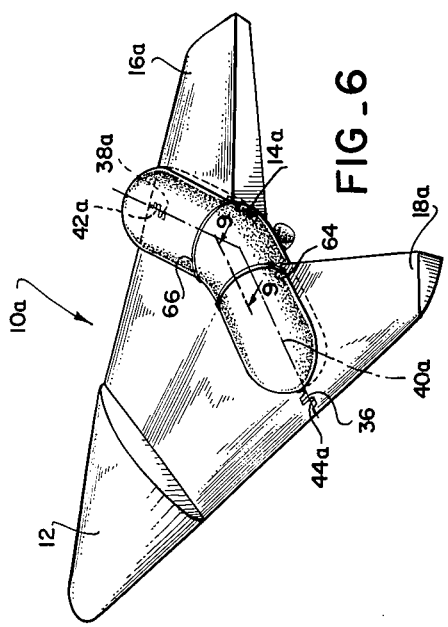
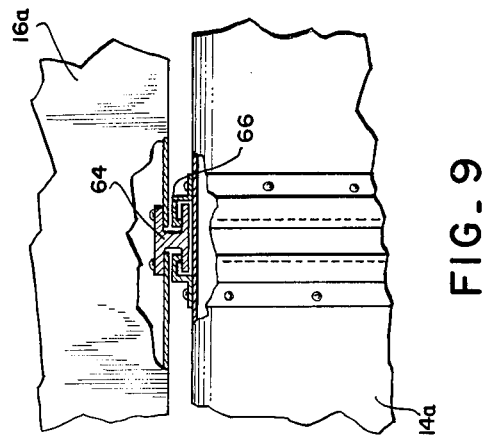
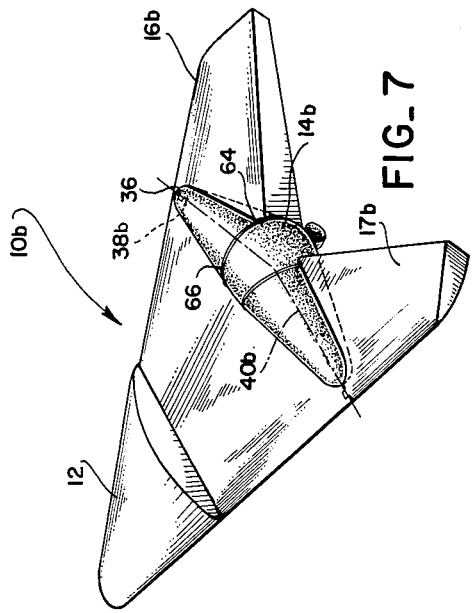
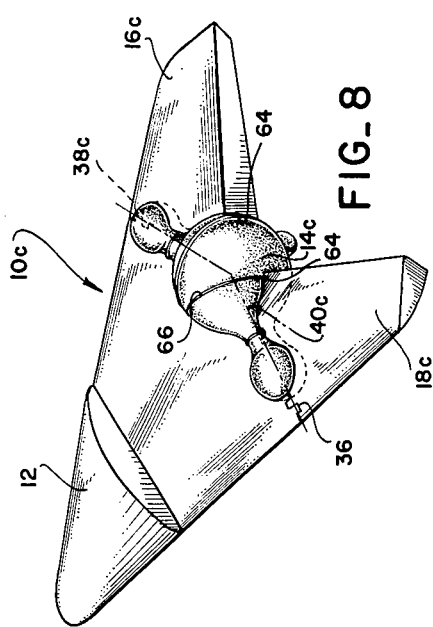
INVENTOR.
HARRY C. POWELL
BY
Agent

United States Patent Office 3,204,892
Patented Sept. 7, 1965

3,204,892
AEROSPACE VEHICLE
Harry C. Powell, Van Nuys, Calif., assignor to Lockheed
Aircraft Corporation, Burbank, Calif.
Filed Aug. 1, 1963, Ser. No. 299,270
8 Claims. (Cl. 244—43)

This invention relates to an aerospace vehicle, and more particularly to an improved collapsible spacecraft of the type disclosed in Patent No. 3,065,937.

Patent No. 3,065,937 recognizes that it is desirable to provide a vehicle for space travel which can be launched into space and brought back through the atmosphere to a safe landing and that two major problems are encountered in launching and landing such a vehicle. The first problem is concerned with the launching phase wherein the great speed developed upon launching a vehicle requires that aerodynamic forces upon the vehicle and its propulsion means be substantially symmetrical or balanced about its axis of movement in order to minimize control problems. The second major problem is that of providing a vehicle which may be controlled within the atmosphere but which must be designed within the limits imposed by the launch phase.

The collapsible spacecraft disclosed in said patent overcame these problems by providing a vehicle comprising a compact package for launching into space and having aerodynamic support means for flight within the atmosphere. The aerodynamic support means is folded to reduce the size of the vehicle and produce a symmetrical vehicle for the launching phase and is then unfolded for flight in the atmosphere. While this spacecraft is generally satisfactory, the presently disclosed vehicle includes certain advantages thereover.

In view of the foregoing characteristic of collapsible spacecraft of the type disclosed in Patent No. 3,065,937, it is a primary object of the present invention to provide a new aerospace vehicle incorporating certain improvements over prior art vehicles and having a capsule shaped to fit the contour-of-revolution of the vehicle's foldable wings.

Another object of the present invention is to provide an aerospace vehicle having a crew compartment or capsule incorporating an aft protrusion from a forewing body when the vehicle's wings are folded upon the body so that ingress to and egress from the capsule may be effected efficiently and safely while the vehicle is on a launch pad.

Yet another object of the present invention is to provide a collapsible spacecraft of the type having aerodynamic support means which is folded into a compact package to reduce the size of the vehicle for launching into space and which is unfolded for controlled flight in space and upon re-entry into the atmosphere and wherein the aerodynamic support means presents an aerodynamically clean and efficient surface in its unfolded position.

A further object of the present invention is to provide an aerospace vehicle of the type described having a compact capsule which may be pressurized while the vehicle is on a launch pad.

A still further object of the present invention is to provide an aerospace vehicle of the type described which exposes a major portion of the crew compartment during launch to facilitate emergency escapement in the event of a launch pad abort.

As used herein, the expression "contour-of-revolution" shall mean the surface of a geometrical figure generated by the revolution of a plane geometrical figure about its major axis.

According to the present invention, a delta-shaped fore wing is provided at its aft end with a capsule which is faired in the shape of a contour-of-revolution about a wing hinge line so that the wings will follow the capsule contour as they are folded upon the fore wing body for launching. This eliminates relieved areas in the wings to accommodate the capsule in the folded position. Efficient aerodynamic surfaces are provided in the foldable wing by placing the wing fold in the vehicle in a manner similar to that empolyed on carrier based aircraft. The design and location of the capsule leaves a major portion of it exposed when the wings are in their folded position ready for launching.

The capsule may be spherically shaped with its center located at the intersection of the hinge line connecting the foldable wings to the fore wing body. Alternatively, the capsule may be of any other suitable shape which permits the foldable wings to follow the contour-of-revolution of the capsule in the manner of a ball-and-socket joint when the wings are folded upon the fore wing body.

A small rocket motor may be provided for maneuvering and controlling the vehicle while it is in space and fuel may be supplied to the rocket motor from fuel tanks forming the leading edges of the fore wing body. Elevons and landing gear may also be provided.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which;

FIGURE 1 is a plan view of an aerospace vehicle of the present invention with its wings extended;

FIGURE 2 is a side elevational view of the aerospace vehicle of FIGURE 1 with its wings folded;

FIGURE 3 is an end view taken along line 3—3 of FIGURE 2;

FIGURE 4 is an elevational view of the aerospace vehicle of FIGURE 1 with its wings folded into a compact, symmetrical package mounted atop a launching rocket;

FIGURE 5 is a perspective view of the aerospace vehicle of FIGURE 1;

FIGURES 6–8 are perspective views, showing somewhat schematically modifications of the aerospace vehicle of FIGURE 1; and FIGURE 9 is a partial cross-sectional view, on an enlarged scale, taken along line 9—9 of FIGURE 6.

Referring again to the drawings and particularly to FIGURES 1–5, an aerospace vehicle constituting one embodiment of the present invention, generally designated 10, includes a delta-shaped fore wing body portion 12, a capsule or crew compartment 14, foldable wings 16 and 18, a retractable nose wheel 20 and retractable skids 22.

The body portion 12 may be constructed of light trusses, such as shown at 24, covered wtih a suitable metallic skin 26. It includes leading edges 28 and 30 in which fuel and oxidizer tanks 32 and 34, respectively, may be mounted. The capsule 14 is rigidly affixed adjacent the rear edge 36 of the body portion 12 and extends above and aft thereof. The wings 16 and 18 have fore edges or hinge lines 38 and 40, respectively, and are hinged to the body portion 12 by hinge means 42 and 44, respectively. The portion of the wing fore edges 38 and 40 adjacent the capsule 14 are shaped to follow a contour-of-revolution of capsule 14 so that a ball-and-socket effect exists between the unfolding wings and the capsule surface. This is an important feature of the invention because it permits exposing a major portion of capsule 14 when the wings 16 and 18 are folded upon the body portion 12 and makes it unnecessary to relieve the wings to accommodate the capsule.

A drag rudder 46 is provided on each wing 16 and 18 to control the vehicle 10 during flight in the atmosphere. The wings 16 and 18 are sometimes hinged by means of hinges 48 and 50, respectively, so that the rear portions of the wings may be employed as elevons during controlled flight in the atmosphere. Alternatively, the hinges 48 and 50 may be dispensed with and the wings 16 and 18 may be employed as elevons by swinging them about hinges 42 and 44, respectively.

A small rocket motor 52 (FIGURE 2) may be attached to the rear edge 36 of body portion 12 to control the vehicle 10 directionally in space and for additional thrust during the landing phase, if such is necessary. A conduit 54 connects rocket motor 52 to the fuel tank 32 and a conduit 56 connects the motor 52 to the oxidizer tank 34.

The wings 16 and 18 may be folded upon the body portion 12 to form a small, symmetrically balanced package which may be positioned on a rocket 60 (FIGURE 4) and launched into space. An access door 62 is provided on capsule 14 and permits ready ingress to or egress from the capsule 14 even when the vehicle 10 is in position on the rocket 60.

FIGURES 6, 7 and 8 illustrate somewhat schematically three of many possible aerospace vehicle configurations featuring capsules having a contour-of-revolution shape fairing into a centrally located member. In each instance, the vehicle hinge line and the contour-of-revolution directrix are common.

The aerospace vehicle 10a of FIGURES 6 and 9 includes a fore wing body portion 12 having an aft edge 36, all basic portions of which may be identical with the embodiment of FIGURE 1. A substantially wiener-shaped capsule 14a is symmetrical about hinge fold lines 38a and 40a and is mounted on the fore wing body portion 12. The hinge lines 38a and 40a for the wings 16a and 18a, respectively, are contoured at their juncture with capsule 14a to slide over the capsule 14a when the wings are folded upon the body portion 12 in "ball-and-socket" fashion. Hinges 42a and 44a connect the outer edges of wings 16a and 18a, respectively, to the body portion 12. The inner edge of each wing carries guide and support means for structurally orienting and supporting the wing during folding and unfolding sequences. I-shaped member 64 which slidably engages a channel 66 is mounted on capsule 14a at right angles to the respective hinge lines 38a and 40a. This is a representatively illustrated support. Other configurations may be substituted for this purpose without departing from the intended scope of the invention.

The aerospace vehicle 10b shown in FIGURE 7 includes a body portion 12 having a rear edge 36 which are generally identical with the embodiment shown in FIGURE 1. A capsule 14b, which somewhat resembles two cones with their large ends scarfed and abutting each other, is mounted on the body portion 12. The hinge lines 38b and 40b for the wings 16b and 17b, respectively, are again common with the contour-of-revolution directrix which the respective wings follow in swinging up over capsule 14b when the wings 16b and 17b are folded upon the body portion 12. Hinge means similar to those shown at 42a, 44a, 64 and 66 in FIGURES 6 and 9 may be provided.

The aerospace vehicle 10c shown in FIGURE 8 includes a body portion 12 having a rear edge 36 which is again substantially identical with the embodiment shown in FIGURE 1. The capsule 14c resembles a dumbell with an enlarged midsection and, once again, the hinge lines 38c and 40c for the wings 16c and 18c, respectively, follow the contour-of-revolution directrix as the wings 16c and 18c swing upon fore wing 12.

While the particular aerospace vehicles herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:
1. A vehicle comprising:
   (a) fore wing means having an aft edge;
   (b) a crew compartment affixed to said aft edge;
   (c) foldable wing means having a fore edge pivotally connected to said aft edge and being adapted to fold upon said fore wing means, the fore edge of said foldable wing means forming a contour-of-revolution with said crew compartment; and
   (d) retractable landing gear means mounted on said foldable wing means.
2. The vehicle of claim 1 including elevon means pivotally mounted upon said foldable wing means and drag rudder means pivotally mounted upon said elevon means.
3. An aerospace vehicle comprising:
   (a) fore wing body means having an acute angle apex with adjacent edges forming wing leading edges, said body means including an aft edge;
   (b) pivot means mounted on said aft edge on a line substantially perpendicular to each leading edge;
   (c) a capsule mounted as a contour-of-revolution about said line and having a portion extending aft of said aft edge; and
   (d) foldable wing means pivotally mounted on said pivot means and having leading edges forming continuations of each leading edge of said fore wing means when said foldable wing means is in an extended position, said foldable wing means having a fore edge forming a contour-of-revolution with said capsule, whereby said contour-of-revolution on said fore edge follows the contour of said capsule when said foldable wing means is pivoted about said pivot means and positioned upon said fore wing means.
4. An aerospace vehicle comprising:
   (a) a fore body having an acute angle apex with adjacent edges forming leading, aerodynamic edges, said fore body including an aft edge;
   (b) pivot means mounted on said aft edge;
   (c) a pair of wings pivotally mounted on said pivot means, said wings being swingable from a position aft of said body where said wings form a continuation of said leading aerodynamic edges to a position adjacent to and parallel with said fore body;
   (d) elevon means pivoted to each wing; and
   (e) a capsule mounted on said fore body intermediate of said fore body and said wings such that said wings pivot about said capsule in a contour-of-revolution.
5. The vehicle of claim 4 wherein said capsule is spherically shaped.
6. The vehicle of claim 4 wherein said capsule has a central spherical portion connected to a pair of spherical portions on opposite sides thereof, said last-mentioned spherical portions being mounted concentrically about said aft edge.
7. The vehicle of claim 4 wherein said capsule includes portions resembling a pair of cones having scarfed bases connected centrally of said capsule as an integral unit, said cone-shaped portions being mounted concentrically about said aft edge.
8. The vehicle of claim 4 wherein guide and support means is provided upon said capsule and said wings for guidedly supporting said wings during pivotal sequences.

References Cited by the Examiner

UNITED STATES PATENTS 3,065,937  11/62  Vigil _____ 244—46

FERGUS S. MIDDLETON, *Primary Examiner.*